(12) United States Patent
Chu et al.

(10) Patent No.: US 11,580,408 B2
(45) Date of Patent: Feb. 14, 2023

(54) SEARCH METHOD, DEVICE AND STORAGE MEDIUM FOR NEURAL NETWORK MODEL STRUCTURE

(71) Applicant: Beijing Xiaomi Intelligent Technology Co., Ltd., Beijing (CN)

(72) Inventors: Xiangxiang Chu, Beijing (CN); Ruijun Xu, Beijing (CN); Bo Zhang, Beijing (CN); Jixiang Li, Beijing (CN); Qingyuan Li, Beijing (CN)

(73) Assignee: Beijing Xiaomi Intelligent Technology Co., Ltd., Beijing (CN)

( * ) Notice: Subject to any disclaimer, the term of this patent is extended or adjusted under 35 U.S.C. 154(b) by 413 days.

(21) Appl. No.: 16/830,566

(22) Filed: Mar. 26, 2020

(65) Prior Publication Data

US 2021/0110276 A1 Apr. 15, 2021

(30) Foreign Application Priority Data

Oct. 15, 2019 (CN) .......................... 201910979571.7

(51) Int. Cl.
| | |
|---|---|
| *G06N 3/00* | (2006.01) |
| *G06N 3/086* | (2023.01) |
| *G06F 7/58* | (2006.01) |
| *G06K 9/62* | (2022.01) |
| *G06N 3/04* | (2023.01) |

(52) U.S. Cl.
CPC ............... *G06N 3/086* (2013.01); *G06F 7/58* (2013.01); *G06K 9/6262* (2013.01); *G06N 3/0454* (2013.01); *G06N 3/0472* (2013.01)

(58) Field of Classification Search
CPC .... G06N 3/086; G06N 3/0454; G06N 3/0472; G06F 7/58; G06K 9/6262
See application file for complete search history.

(56) References Cited

U.S. PATENT DOCUMENTS

2015/0106311 A1* 4/2015 Birdwell .................. G06N 3/08
706/26

OTHER PUBLICATIONS

Notification of Reason for Refusal of Korean Application No. 10-2020-0004723, dated Aug. 23, 2021.
(Continued)

*Primary Examiner* — Michael R Neff
(74) *Attorney, Agent, or Firm* — Finnegan, Henderson, Farabow, Garrett & Dunner, L.L.P.

(57) ABSTRACT

A search method for a neural network model structure, includes: generating an initial generation population of network model structure based on multi-objective optimization hyper parameters, as a current generation population of network model structure; performing selection and crossover on the current generation population of network model structure; generating a part of network model structure based on reinforcement learning mutation, and generating a remaining part of network model structure based on random mutation on the selected and crossed network model structure; generating a new population of network model structure based on the part of network model structure generated by reinforcement learning mutation and the remaining part of network model structure generated by random mutation; and searching a next generation population of network model structure based on the current generation population of network model structure and the new population of network model structure.

18 Claims, 11 Drawing Sheets

(56) References Cited

OTHER PUBLICATIONS

Chu, Xiangxiang et al., "Multi-Objective Reinforced Evolution in Mobile Neural Architecture Search", arXiv:1901.01074v1 [cs.NE], Jan. 4, 2019, 9 pages.
Extended European Search Report in the European Application No. 20168818.1, dated Oct. 1, 2020.
Zhichao Lu et al., NSGA-NET: A Multi-Objective Genetic Algorithm for Neural Architecture Search, Michigan State University, East Lansing, MI 48864, Oct. 8, 2018, 23 pages.
Xiangxiang Chu et al., Multi-Objective Reinforced Evolution in Mobile Neural Architecture Search, Jan. 16, 2019, 10 pages.
First Office Action of Japanese Application No. 2020-001534, dated Feb. 25, 2021.
Yukang Chen et al., RENAS: Reinforced Evolutionary Neural Architecture Search, 2019 IEEE/CVF Conference on Computer Vision and Pattern Recognition (CVPR), Jul. 26, 2020, pp. 4782-4791.
Anonymous authors, NSGA-NET: A Multi-Objective Genetic Algorithm for Neural Architecture Search, Under review as a conference paper at ICLR 2019, 29 pages.

\* cited by examiner

SEARCH METHOD, DEVICE AND STORAGE MEDIUM FOR NEURAL NETWORK MODEL STRUCTURE

CROSS-REFERENCE TO RELATED APPLICATION

This application is based upon and claims priority to Chinese Patent Application No. 201910979571.7, filed on Oct. 15, 2019, the entire content of which is incorporated herein by reference.

TECHNICAL FIELD

The present disclosure relates to the field of deep learning, particularly to a search method, device and storage medium for a neural network model structure.

BACKGROUND

Deep learning neural network achieves feature extraction of end-to-end, which is an improvement over manual feature extraction. At the same time, artificially designed neural network architectures increase complexity of neural network.

With the development of technology, neural architecture search (NAS) realizes designing neural network by using neural network, and represents a direction of future development of machine learning. In NAS technology, evolutionary algorithm or reinforcement learning algorithm is used as search strategy to search the neural network model structure.

SUMMARY

According to a first aspect of embodiments of the present disclosure, a search method for a neural network model structure, includes: generating an initial generation population of network model structure based on multi-objective optimization hyperparameters, as a current generation population of network model structure; performing selection and crossover on the current generation population of network model structure; generating a part of network model structure based on reinforcement learning mutation, and generating a remaining part of network model structure based on random mutation on the selected and crossed network model structure; generating a new population of network model structure based on the part of network model structure generated by reinforcement learning mutation and the remaining part of network model structure generated by random mutation; searching a next generation population of network model structure based on the current generation population of network model structure and the new population of network model structure; and using the next generation population of network model structure as the current generation population of network model structure, repeating the performing selection and crossover, the generating a part of network model structure and generating a remaining part of network model structure, the generating a new population of network model structure, and the searching a next generation population of network model structure, until a multi-objective optimization state is optimal, and selecting a neural network model structure suitable for different scenarios from a final generation population of network model structure.

According to a second aspect of embodiments of the present disclosure, a search device for a neural network model structure, includes: a processor; and a memory storing instructions executable by the processor, wherein the processor is configured to: generate an initial generation population of network model structure based on multi-objective optimization hyperparameters, as a current generation population of network model structure; perform selection and crossover on the current generation population of network model structure; generate a part of network model structure based on reinforcement learning mutation, and generate a remaining part of network model structure based on random mutation on the selected and crossed network model structure; generate a new population of network model structure based on the part of network model structure generated by reinforcement learning mutation and the remaining part of network model structure generated by random mutation; search a next generation population of network model structure based on the current generation population of network model structure and the new population of network model structure; and using the next generation population of network model structure as the current generation population of network model structure, repeat the performing selection and crossover, the generating a part of network model structure and generating a remaining part of network model structure, the generating a new population of network model structure, and the searching a next generation population of network model structure, until a multi-objective optimization state is optimal, and select a neural network model structure suitable for different scenarios from a final generation population of network model structure.

According to a third aspect of embodiments of the present disclosure, a non-transitory computer-readable storage medium has stored therein instructions that, when executed by a processor of a terminal, cause the terminal to perform the search method according to the first aspect.

The technical solutions provided by the embodiments of the present disclosure may include the following beneficial effects: based on reinforcement learning mutation, the learned network model structure may be used. Performing random mutation on network model structure in selected and crossed population of network model structure population can avoid a certain degree of model degradation during evolution process. By combining reinforcement learning mutation and random mutation, the use of reinforcement learning algorithm to adjust random mutation process in evolutionary algorithm is realized, and a balance between exploring randomness and using learned information is achieved.

It should be understood that both the foregoing general description and the following detailed description are exemplary only and are not restrictive of the present disclosure.

BRIEF DESCRIPTION OF THE DRAWINGS

The accompanying drawings, which are incorporated in and constitute a part of this specification, illustrate embodiments consistent with the present disclosure, and together with the description, serve to explain the principle of the present disclosure.

DETAILED DESCRIPTION

Exemplary embodiments will be illustrated in detail here, examples of which are expressed in the accompanying drawings. When the following description refers to the accompanying drawings, the same numbers in different drawings represent the same or similar elements unless otherwise indicated. The implementations described in the following exemplary embodiments do not represent all implementations consistent with the disclosure. Instead, they are merely examples of devices and methods consistent with aspects of the disclosure as recited in the appended claims.

Figure 1:
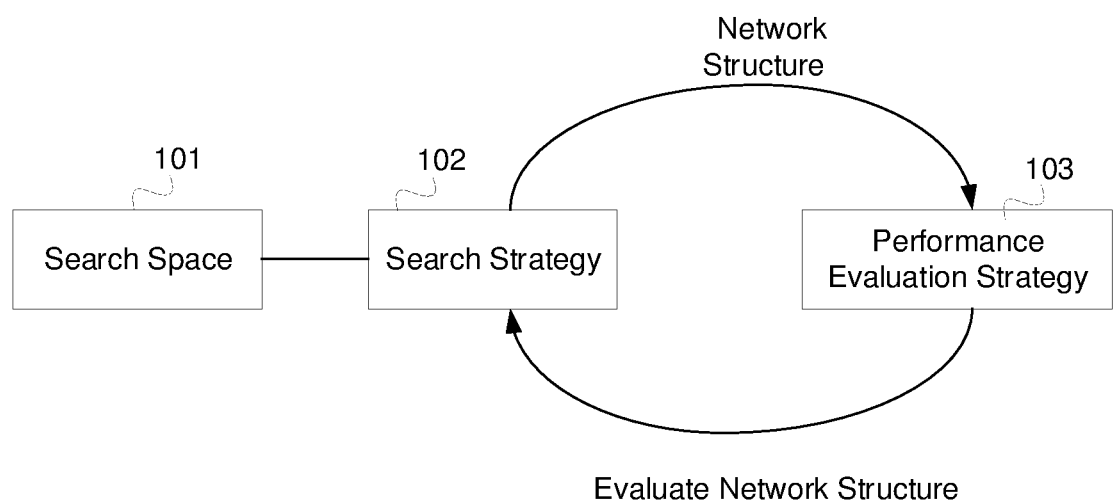
FIG. 1 is a schematic diagram showing a search method for a neural network model structure according to an exemplary embodiment.

Embodiments of the present disclosure provide search methods for a neural network model structure. FIG. 1 is a schematic diagram of a search method of a neural network model structure according to some exemplary embodiments. Referring to FIG. 1, the search method of the neural network model structure involves a search space 101, a search strategy 102, and a performance evaluation strategy 103. In the search method of the neural network model structure, the search strategy 102 is used to search for a network structure in the search space 101, the performance of the searched network structure is evaluated by the performance evaluation strategy 103, and the search strategy 102 is updated according to evaluation results. This network structure search and evaluation process is repeatedly performed to finally search for a neural network model structure that meets evaluation requirements.

Figure 2:
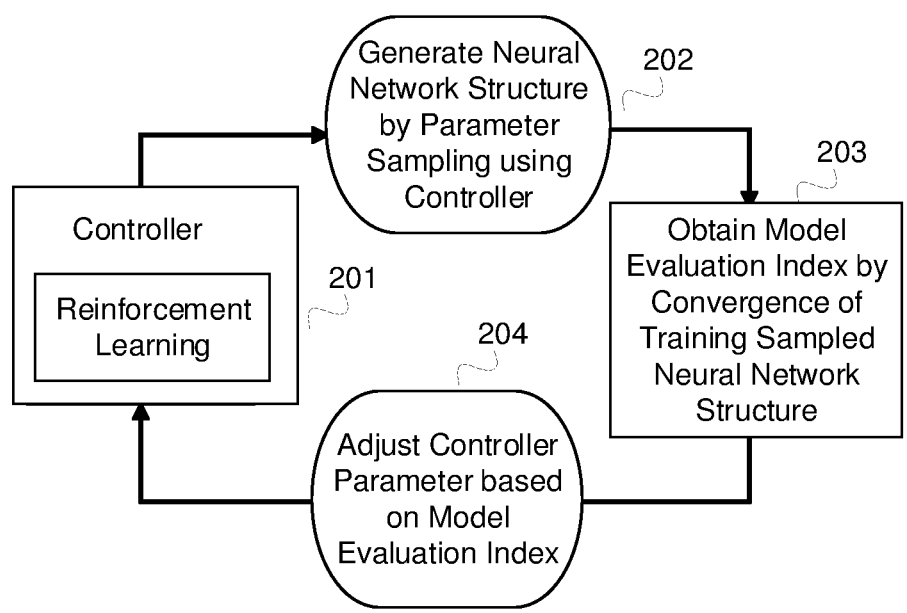
FIG. 2 is a schematic diagram showing an implementation process of a reinforcement learning algorithm according to an exemplary embodiment.
Figure 3:
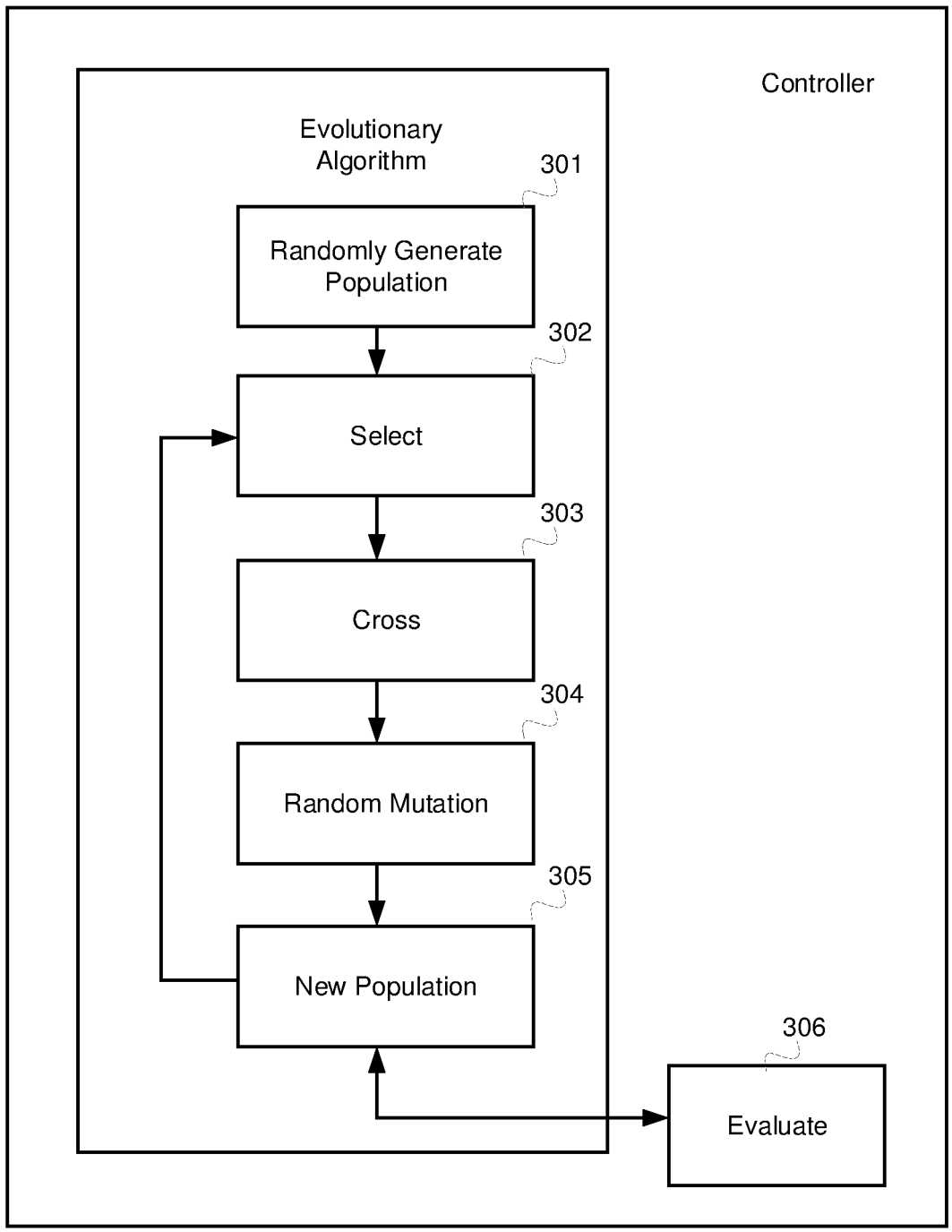
FIG. 3 is a schematic diagram showing an implementation process of an evolutionary algorithm according to an exemplary embodiment.

In some embodiments, the search strategy used when searching the neural network model structure may be obtained based on a network model structure generated by an evolutionary algorithm, such as NSGA-II multi-objective optimization evolutionary algorithm, or a reinforcement learning algorithm in a controller. For example, referring to FIG. 2, a controller uses the reinforcement learning algorithm to generate the neural network structure (201). The neural network structure is generated by parameter sampling using the controller (202), and a model evaluation index is obtained by the convergence of the training sampled neural network structure (203). The model evaluation index is used to adjust the control parameter and restart the reinforcement learning process (204). The above process is repeatedly performed until the neural network structure that meets the evaluation requirement is generated. Referring to FIG. 3, the controller generates the neural network structure by using the NSGA-II multi-objective optimization evolutionary algorithm. The population of the network model structure is randomly generated based on multi-objective optimization hyperparameters such as inference time, evaluation indexes, network performance indexes, network calculations, and network parameters (301). The network model structure that meets the requirements is initially selected in the randomly generated population of network model structure (302). The preliminary selected network model structure is further performed by a crossover algorithm to achieve selection of the network model structure that meets standards (303). Random mutation is performed on random populations of network model structure (304) after selection and crossover to generate a new population of network model structures (305). Performance evaluation is performed on the network model structure in the new population of network model structure (306), the next generation network model structure is searched, and selection, crossover, and random mutation processes are performed on the searched next generation network model structure. The above process is repeatedly performed until the neural network structure that meets the evaluation requirement is obtained, the search strategy that meets the requirements is obtained, and the search of the neural network model structure is completed.

In some embodiments, the evolutionary algorithm or the reinforcement learning strategy gradient algorithm is used alone as the search strategy in the search method for neural network model structure.

Embodiments of the present disclosure further provide a search method for a neural network model structure, combined with the advantage of the evolutionary algorithm NSGA-II to support multi-objective optimization and to ensure that the generated model does not fall back of the evolutionary algorithm NSGA-II. In the evolutionary algorithm, the reinforcement mutation algorithm is used to adjust the random mutation process to achieve a balance between exploring randomness and using learned information.

Figure 4:
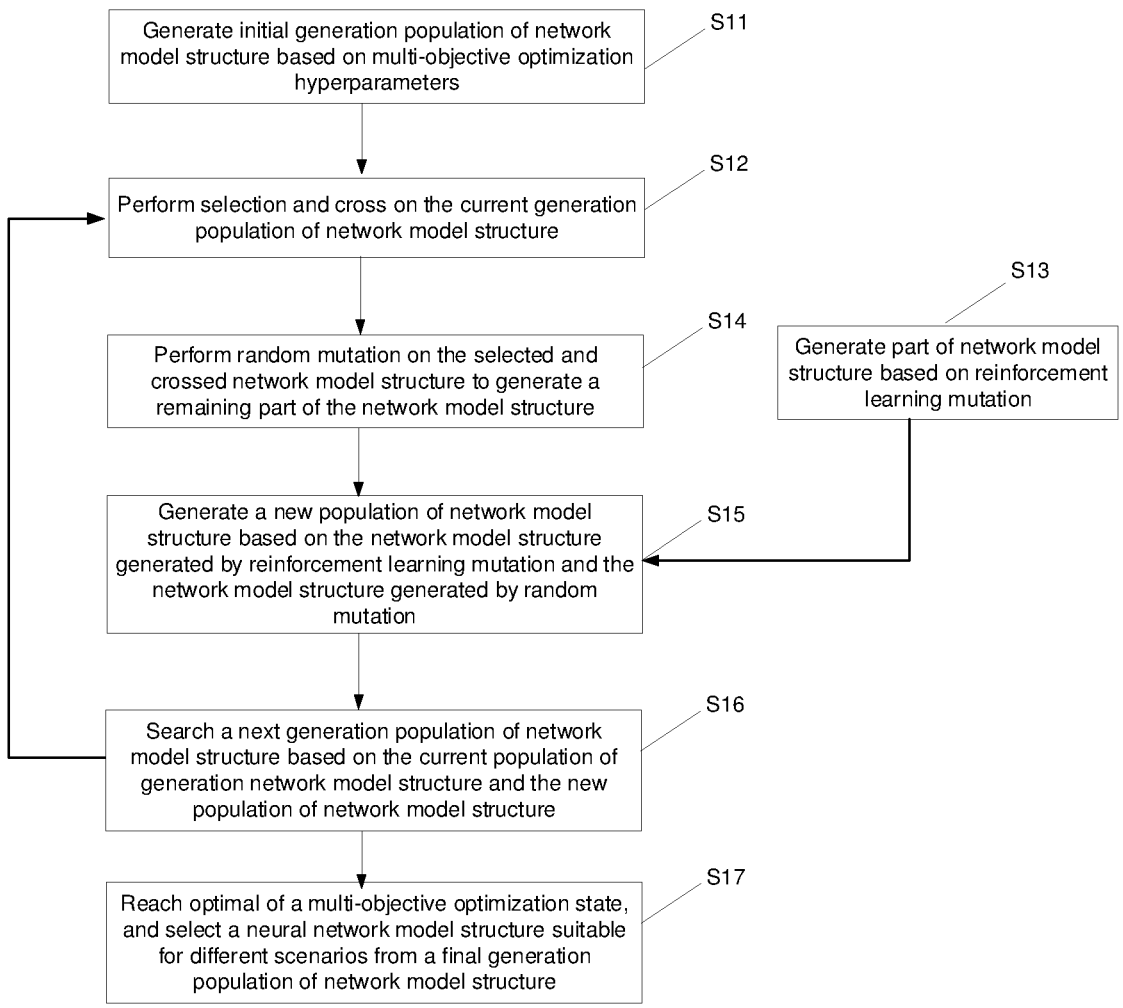
FIG. 4 is a flowchart showing a search method for a neural network model structure according to an exemplary embodiment.

FIG. 4 is a flowchart showing a search method for a neural network model structure according to an exemplary embodiment. For example, the search method of the neural network model structure is used in a terminal and includes the following steps.

In step S11, an initial generation population of network model structure is generated based on multi-objective optimization hyperparameters.

In step S12, selection and crossover on a current generation population of network model structure are performed.

In an embodiment, in an initial stage, the current generation population of network model structure is the initial generation population of network model structure generated based on multi-objective optimization hyperparameters. In a search phase, the current generation population of network model structure is the searched population of network model structure.

In step S13, a part of network model structure is generated based on reinforcement learning mutation.

In step S14, random mutation on the selected and crossed network model structure is performed to generate a remaining part of the network model structure.

In step S15, a new population of network model structure is generated based on the network model structure generated by reinforcement learning mutation and the network model structure generated by random mutation.

In step S16, a next generation population of network model structure is searched based on the current population of generation network model structure and the new population of network model structure.

In the process of searching for the next generation population of the network model structure based on the new population of the network model structure, performance evaluation is performed on the network model structure in the new population of network model structure. If the multi-objective optimization status does not reach an optimal state, the process of selection, crossover, mutation (reinforcement learning mutation and random mutation) is performed on the selected next generation population of the network model structure, to search for the next generation new population of the network model structure.

In step S17, the next generation population of network model structure is used as the current population of generation network model structure, the above process is repeated until a multi-objective optimization state is optimal, and a neural network model structure suitable for different scenarios is selected from a final generation population of network model structure.

In the embodiment, based on reinforcement learning mutation, the learned network model structure may be used. Performing random mutation on network model structure in selected and crossed population of network model structure population can avoid a certain degree of model degradation during evolution process. By combining reinforcement learning mutation and random mutation, the use of reinforcement learning algorithm to adjust random mutation process in evolutionary algorithm is realized, and a balance between exploring randomness and using learned information is achieved.

Figure 5:
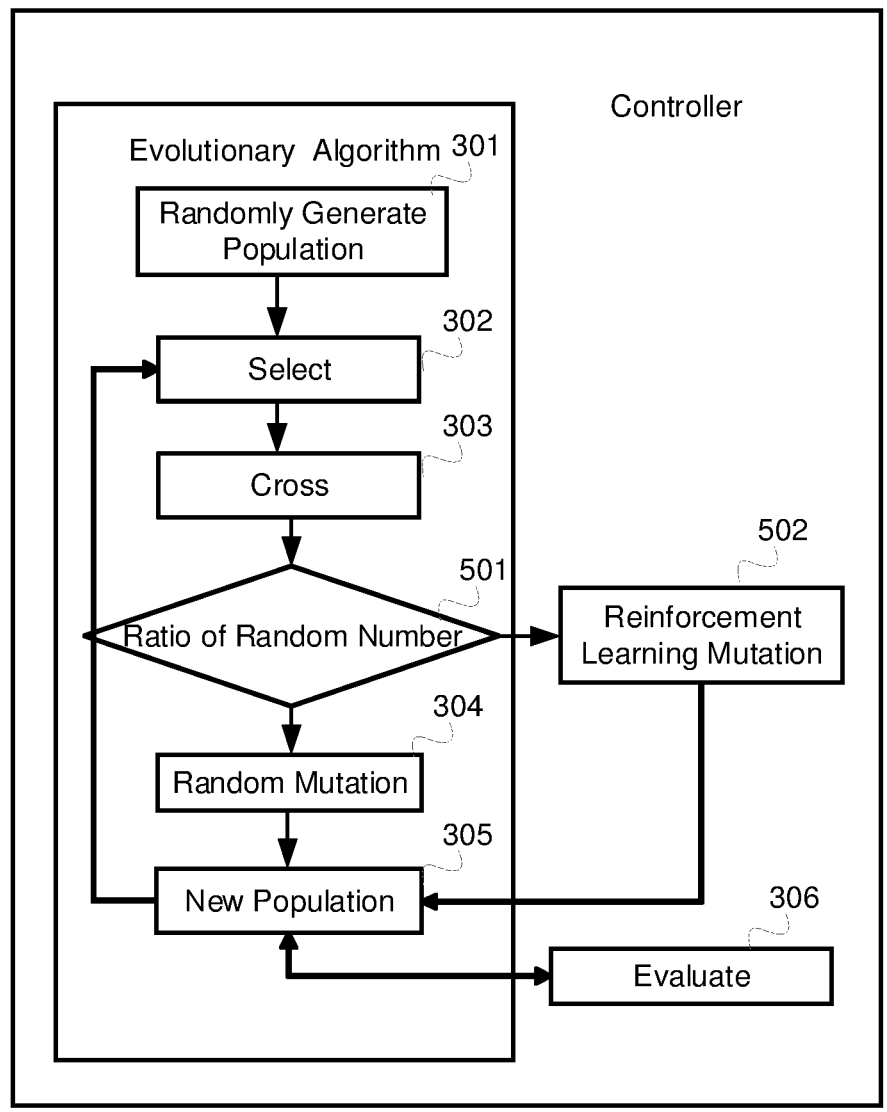
FIG. 5 is a schematic diagram showing a search method for a neural network model structure according to an exemplary embodiment.

FIG. 5 is a schematic diagram showing a search method of neural network model structure according to an exemplary embodiment. In the embodiment, the use of the reinforcement learning algorithm in the evolutionary algorithm to adjust the random mutation process may preset a ratio of the mutation portion of reinforcement learning. The ratio may be a random number ratio. The random number ratio may be an empirical value set according to actual needs. It is mainly based on the need to balance the exploring randomness and using learned information. In the evolutionary algorithm, the reinforcement learning algorithm is used to adjust the random mutation process, and some are based on reinforcement learning mutation. In addition to the steps of the search method illustrated in FIG. 3, the search method in FIG. 5 may further include step 501 and step 502. In step 501, it is determined whether a preset ratio of a random number is satisfied and, if so, reinforcement learning mutation is performed in step 502. For remaining parts, random mutation is performed on the selected and crossed network model structure. A new population of network model structure is generated based on the network model structure generated by reinforcement learning mutation and the network model structure generated by random mutation. The new population of the network model structure is evaluated to search for a neural network model structure based on the new population of the network model structure. For example, satisfying the preset ratio of a random number may be understood as being greater than or equal to the preset ratio of the random number.

By combining the evolutionary algorithm and the reinforcement learning algorithm described above, a balance between exploring randomness and using the learned information in the multi-objective optimization process may be achieved.

In one embodiment of the present disclosure, based on the aforementioned search method of neural network model structure, each network model structure in a new population of network model structure may be sent to a device side running each network model structure, and the network model structure is run by the neural network engine of the device side. And inference time of each network model structure in the new population of the network model structure running on the neural network engine of the device side is obtained. Based on actual inference time of the network model structure running on the neural network engine of the device side, the neural network model structure is searched in the new population of network model structure to facilitate the generation of available neural network model structure for corresponding devices.

Figure 6:
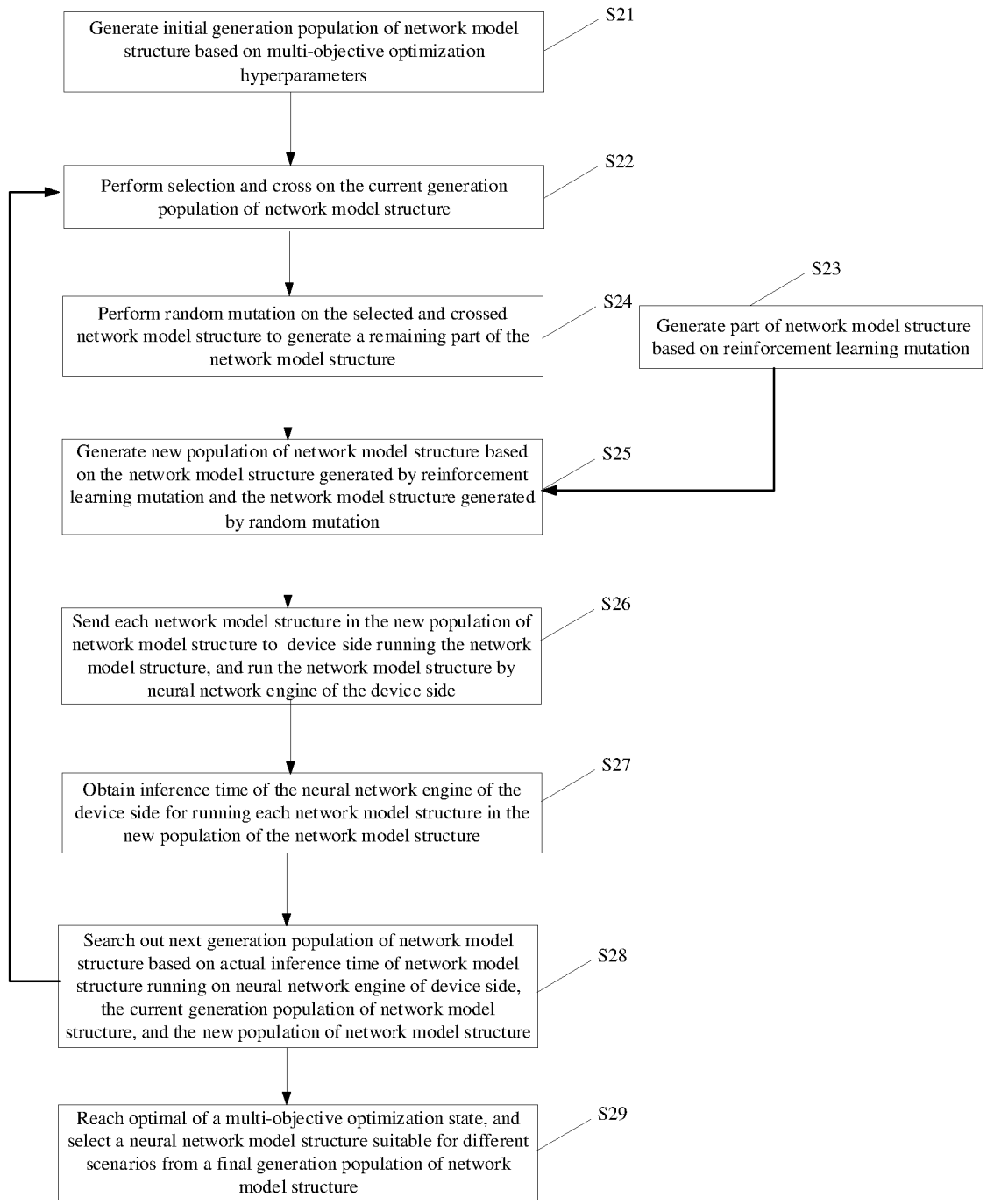
FIG. 6 is a flowchart showing a search method for a neural network model structure according to an exemplary embodiment.

FIG. 6 is a flowchart showing a search method for a neural network model structure according to an exemplary embodiment. For example, the search method of the neural network model structure is used in a terminal and includes the following steps.

Steps S21 to S25 and S29 involved in the search method in FIG. 6 are the same as steps S11 to S15 and S17 in the method in FIG. 4, which will not be repeated here.

In step S26, each network model structure in the new population of network model structure is sent to a device side running the network model structure, and the network model structure is run by a neural network engine of the device side.

In step S27, inference time of the neural network engine of the device side for running each network model structure in the new population of the network model structure is obtained.

Figure 7:
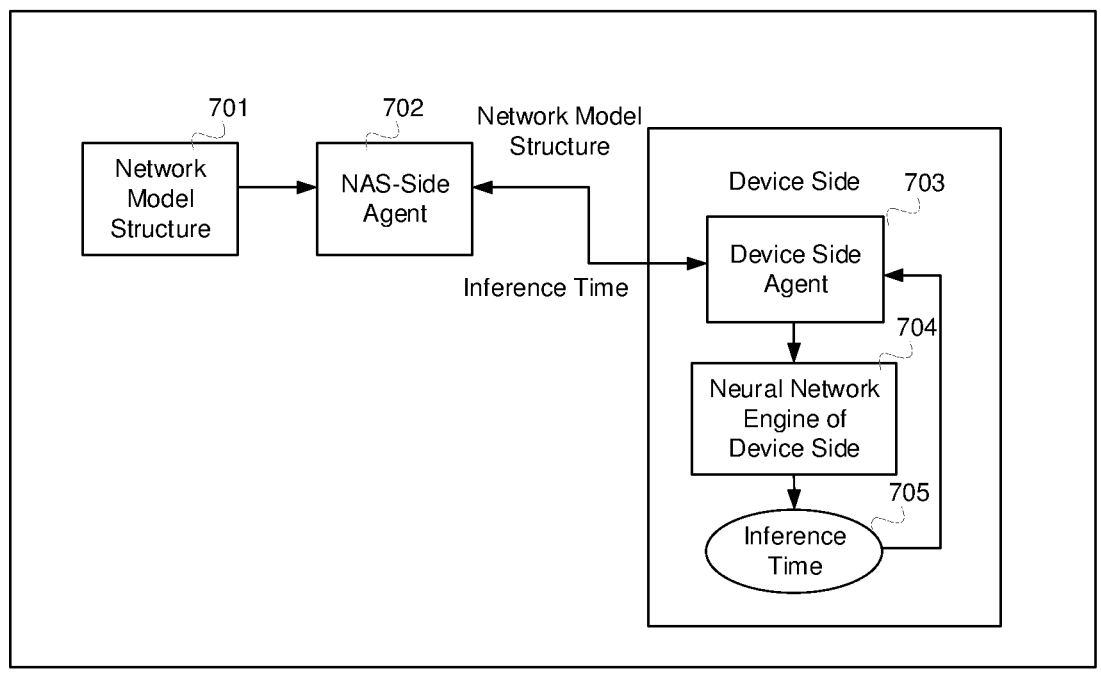
FIG. 7 is a schematic diagram showing a method for determining an inference time according to an exemplary embodiment.

FIG. 7 is a schematic diagram showing a determination process of an inference time according to an exemplary embodiment. Referring to FIG. 7, a network model structure 701 in the new population of the network model structure is sent to a NAS-side agent 702, and the NAS-side agent 702 sends the network model structure to the device running the network model structure. On the device side, a device side agent 703 receives the network model structure and sends it to a neural network engine 704 of the device side, and the neural network engine 704 of the device side runs the network model structure. The device side records an inference time 705 used by the neural network engine 704 of the device side to actually run the network model structure, and the device side agent 703 feeds back to the NAS-side agent 702. After the NAS side agent 702 obtains the inference time used in the network model structure actually running on the neural network engine of the device side sent by the device side agent, the search for the neural network model structure is performed by the controller.

Referring back to FIG. 6, in step S28, the next generation population of network model structure is searched based on the actual inference time of the network model structure running on the neural network engine of the device side, the current generation population of network model structure, and the new population of network model structure.

In the embodiment, the actual inference time of the network model structure running on the neural network engine of the device side is used as one of the multi-objective optimization parameters of each network model structure in the new population of network model structure, and participates in the evaluation of each network model structure in the new population of network model structure. An exemplary evaluation course may include updating the network model structure in an evaluation process, such as updating the inference time of the network model structure that does not meet evaluation requirements of the network model structure to the actual inference time of the network model structure running on the neural network engine of the device side, then the process of selection, crossover, reinforcement learning mutation, random mutation, and generating new population is performed.

In the embodiment, by sending each network model structure in the new population of network model structure to the device side, and searching the neural network model structure based on the actual inference time of the network model structure running on the neural network engine of the device side, it is more beneficial to generate the available neural network model structure corresponding to the device side.

In another embodiment of the present disclosure, a large number of network model structures are randomly generated, and the network model structures are sequentially trained to obtain their true evaluation indexes. The evaluation indexes of the network model structures are trained by using an automatic encoding regressor to obtain an automatic encoding regressor that can predict the evaluation index of the network model structure. Predictive evaluation indicators are used to search the structure of the next generation network model can reduce model evaluation time and improve search efficiency.

Figure 8:
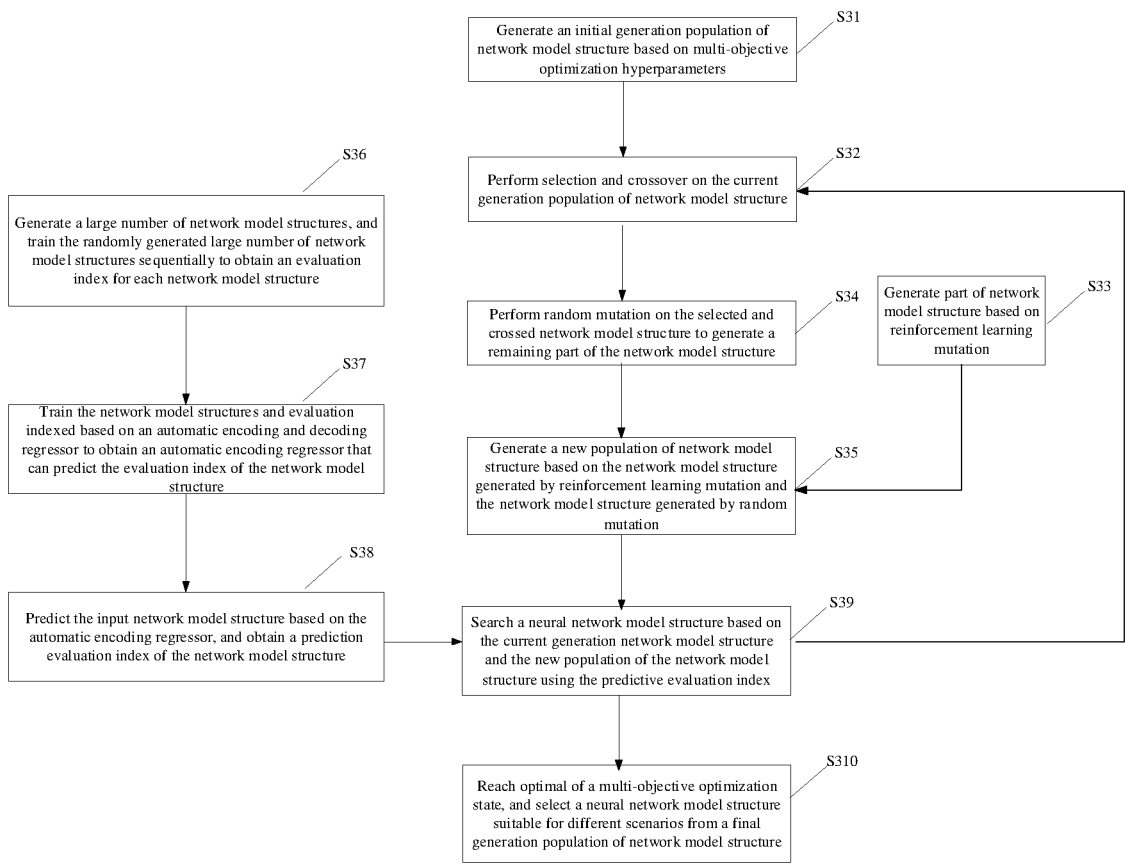
FIG. 8 is a flowchart showing a search method for a neural network model structure according to an exemplary embodiment.

FIG. 8 is a flowchart showing a search method for a neural network model structure according to an exemplary embodiment. For example, the search method of the neural network architecture pattern is used in a terminal and includes the following steps.

Steps S31 to S35 involved in the search method in FIG. 8 are the same as steps S21 to S25 in the method shown in FIG. 6, which will not be repeated here.

In step S36, a large number of network model structures are randomly generated, and the randomly generated large number of network model structures are sequentially trained to obtain an evaluation index for each network model structure.

In step S37, the network model structures and evaluation indexes are trained based on an automatic encoding and decoding regressor to obtain an automatic encoding regressor that can predict an evaluation index of a network model structure.

In step S38, the input network model structure is predicted based on the automatic encoding regressor, and a prediction evaluation index of the network model structure is obtained.

Figure 9:
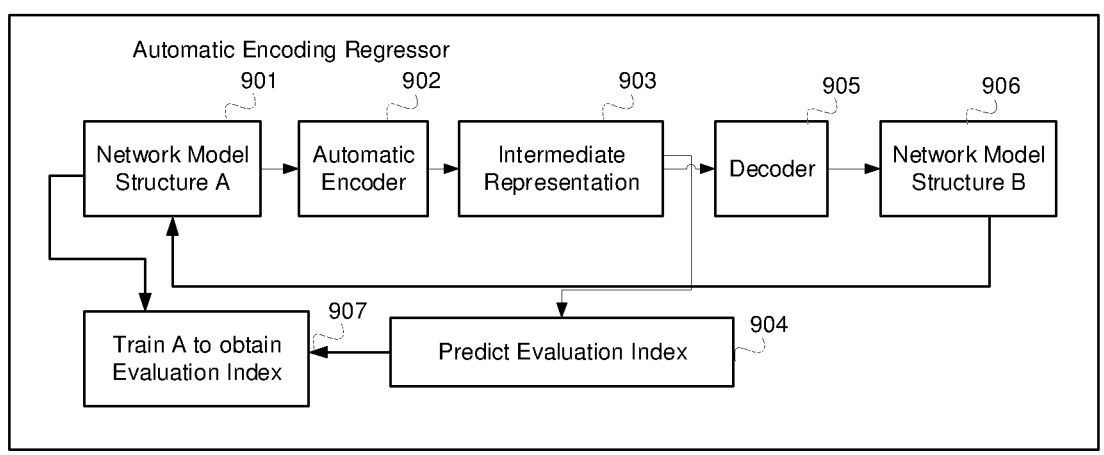
FIG. 9 is a schematic diagram showing a method of obtaining a prediction evaluation index according to an exemplary embodiment.

FIG. 9 is a schematic diagram showing a method of obtaining a prediction evaluation index by training an evaluation index of a network model structure by using an automatic encoding regressor, according to an exemplary embodiment. Referring to FIG. 9, the evaluation index is used as one of the multi-objective optimization hyperparameters, and the generated network model structure A is used as an input parameter 901 to input into an automatic encoder 902. The automatic encoder 902 generates an intermediate representation 903 of inference time and obtains a predictive evaluation index 904 based on the intermediate representation. A decoder 905 of the regressor decodes the intermediate representation 903 to obtain the network model structure B 906, wherein parameters of the regressor are obtained through Back Propagation (BP) training, so that loss (B=A) is minimized After the training is completed, the predictive evaluation index based on the network model structure may be trained based on Back Propagation (BP) algorithm to obtain updated predictive evaluation index to minimize the loss function based on the training evaluation index and the prediction evaluation index (907).

Referring back to FIG. 8, in step S39, a neural network model structure is searched based on the current generation network model structure and the new population of the network model structure using the predictive evaluation index.

In step S310, the above process is repeated until a multi-objective optimization state is optimal, and a neural network model structure suitable for different scenarios is selected from a final generation population of network model structure.

In the embodiment, the automatic encoding regressor is used to train the evaluation index of the network model structure to obtain an automatic encoding regressor capable of predicting the evaluation index, and the prediction evaluation index is used to perform the search of the neural network model structure, which can reduce model evaluation time and improve search efficiency.

Embodiments of the present disclosure further provide a search device for a neural network model structure. The search device for the neural network model structure may include a hardware structure and/or a software module each corresponding to an operation described above. Whether an operation is performed by hardware or software may depend on the specific application and design constraints.

Figure 10:
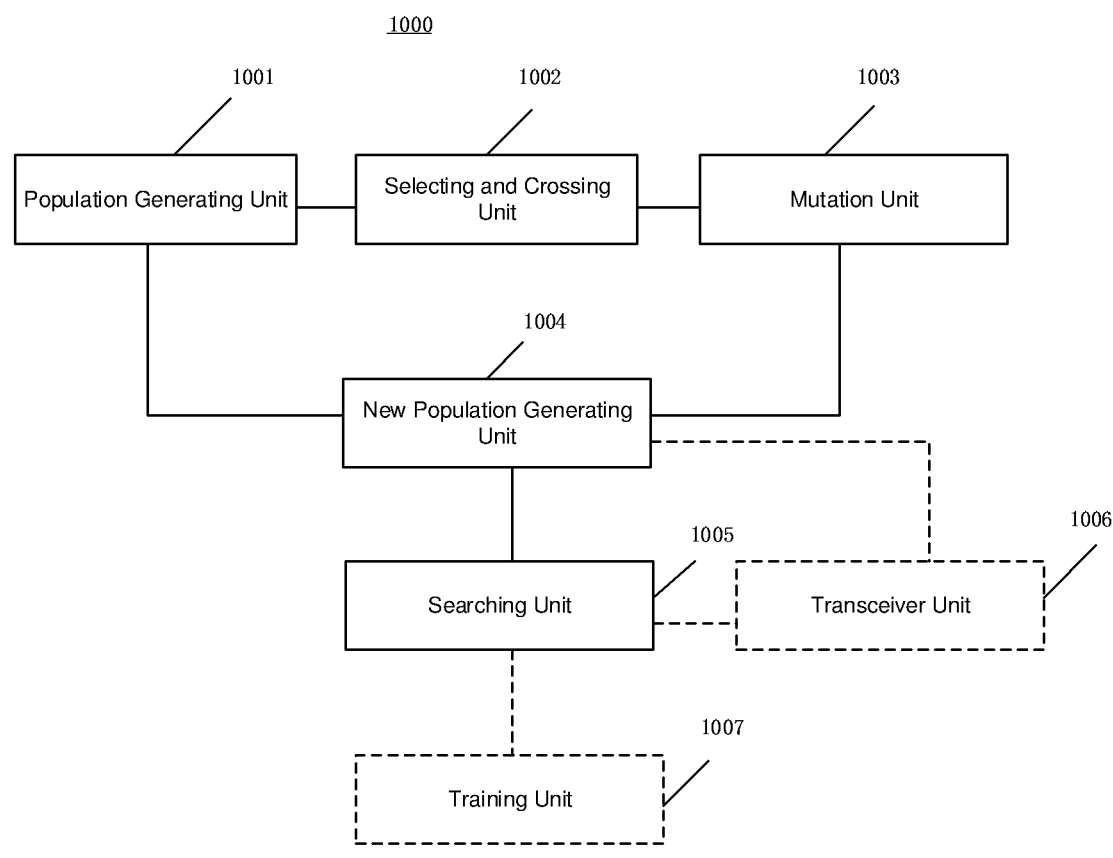
FIG. 10 is a block diagram showing a search device for a neural network model structure according to an exemplary embodiment.

FIG. 10 is a block diagram showing a search device 1000 for a neural network model structure according to an exemplary embodiment. Referring to FIG. 10, the search device 1000 includes a population generating unit 1001, a selecting and crossing unit 1002, a mutation unit 1003, a new population generating unit 1004, and a searching unit 1005.

The population generating unit 1001 is configured to generate an initial generation population of network model structure based on multi-objective optimization hyperparameters. The selecting and crossing unit 1002 is configured to use the initial generation population of network model structure as a current generation population of network model structure, and perform selection and crossover on the current generation population of network model structure. The mutation unit 1003 is configured to generate part of network model structure based on reinforcement learning mutation, and performing random mutation on the selected and crossed network model structure to generate the rest of the network model structure. The new population generating unit 1004 is configured to generate a new population of network model structure based on the network model structure generated by reinforcement learning mutation and the network model structure generated by random mutation. The searching unit, configured to search a next generation population of network model structure based on the current population of generation network model structure and the new population of network model structure; and use the next generation population of network model structure as the current population of generation network model structure, repeating the above process until a multi-objective optimization state is optimal, and select a neural network model structure suitable for different scenarios from a final generation population of network model structure.

In one example, the mutation unit 1003 is configured such that a part of the network model structure that meets a preset ratio of a random number is generated by reinforcement learning mutation, and the other part of the network model structure is randomly generated by the selected and crossed network model structure.

In one example, the multi-objective optimization parameter includes an inference time for running the network model structure. The search device 1000 further includes a transceiver unit 1006, and the transceiver unit 1006 is configured to: after the new population generating unit generates the new population of the network model structure, send each network model structure in the new population of network model structure to a device side running the network model structure, run the network model structure by a neural network engine of the device side, and obtain inference time of the neural network engine of the device side for running each network model structure in the new population of the network model structure. The searching unit 1005 is configured to search the next generation population of network model structure based on the current population of generation network model structure and the new population of network model structure in the following manner: searching the next generation population of network model structure based on the inference time, the current generation population of network model structure, and the new population of network model structure.

In one example, the search device 1000 further includes a training unit 1007, and the training unit 1007 is configured to: use an automatic encoding regressor to train the network model structure and an evaluation index to obtain an automatic encoding regressor capable of predicting the evaluation index.

The searching unit 1005 is configured to search the next generation population of network model structure based on the current population of generation network model structure and the new population of network model structure in the following manner: searching the next generation population of network model structure based on the current population of generation network model structure and the new population of network model structure using a predictive evaluation index. The predictive evaluation index is determined according to the automatic encoding regressor, the automatic encoding regressor is an automatic encoding regressor capable of predicting an evaluation index obtained by pre-training the network model structure and the evaluation index.

With regard to the device in the above embodiments, the specific manner in which each of the modules performs operation has been described in detail in the embodiments of the related methods.

Figure 11:
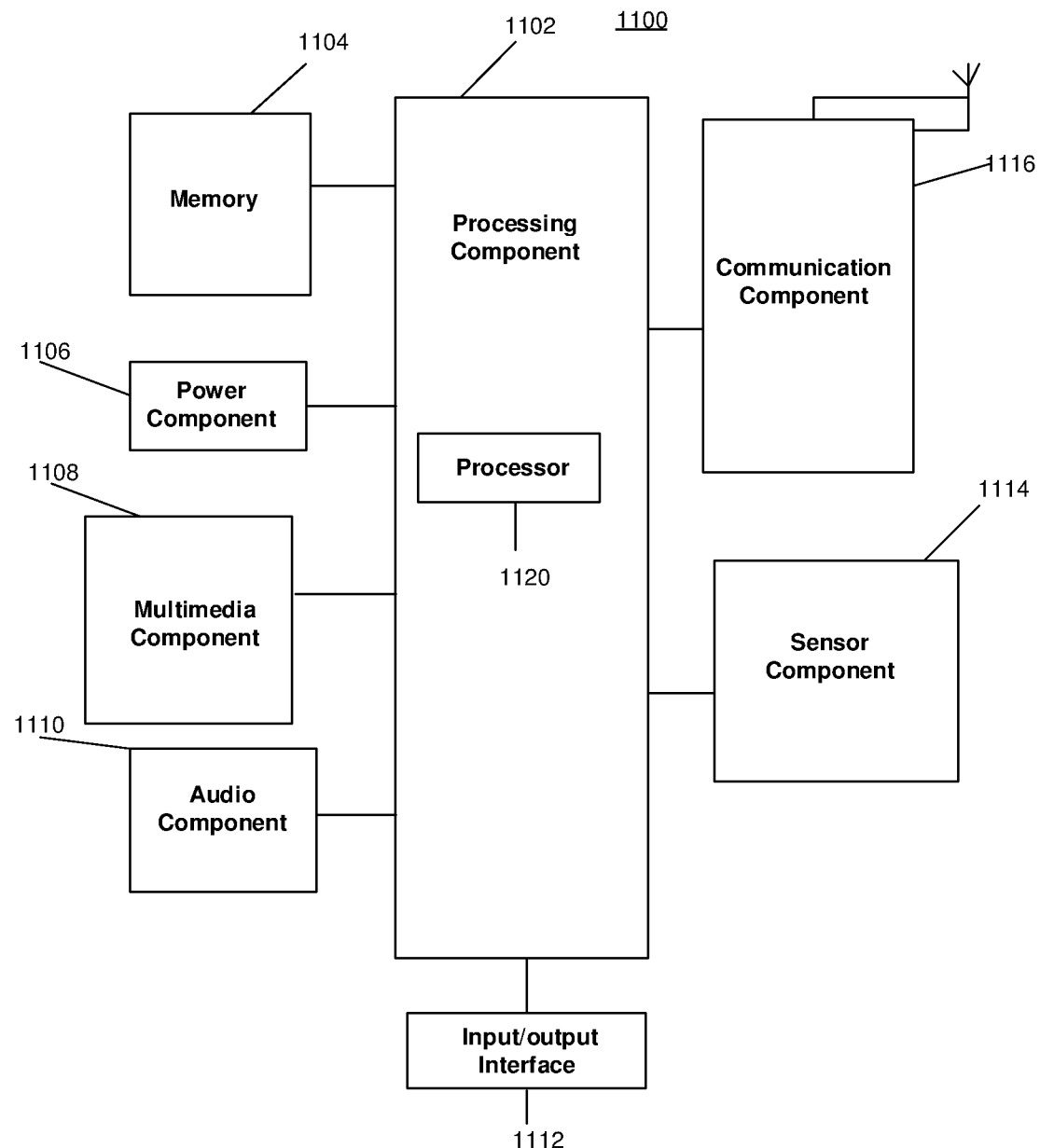
FIG. 11 is a block diagram showing a search device for a neural network model structure according to an exemplary embodiment.

FIG. 11 is a block diagram showing a search device 1100 for a neural network model structure according to an exemplary embodiment. For example, the search device 1100 for the neural network model structure may be a mobile phone, a computer, a digital broadcast terminal, a messaging device, a game console, a tablet device, a medical device, a fitness device, a personal digital assistant, and the like.

Referring to FIG. 11, the search device 1100 for the neural network model structure may include one or more of following components: a processing component 1102, a memory 1102, a power component 1106, a multimedia component 1108, an audio component 1110, an input/output (I/O) interface 1112, a sensor component 1114 and a communication component 1116.

The processing component 1102 typically controls the overall operation of the search device 1100 for the neural network model structure, such as operation associated with display, telephone calls, data communications, camera operation and recording operation. The processing component 1102 may include one or more processors 220 to execute instructions to perform all or part of the steps of the methods described above. Moreover, the processing component 1102 may include one or more modules to facilitate interaction between the processing component 1102 and other components. For example, the processing component 1102 may include a multimedia module to facilitate interaction between the multimedia component 1108 and the processing component 1102.

The memory 1102 is configured to store various types of data to support operation at the search device 1100 for the neural network model structure. Examples of such data include instructions of any application or method operated on the search device 1100 for the neural network model structure, contact data, phone book data, messages, pictures, videos, and the like. The memory 1102 may be implemented by any type of volatile or non-volatile storage devices, or a combination thereof, which may be such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a disk or an optical disk.

The power component 1106 provides power to various components of the search device 1100 for the neural network model structure. The power component 1106 may include a power management system, one or more power sources, and other components associated with generating, managing, and distributing power for the search device 1100 for the neural network model structure.

The multimedia component 1108 includes a screen that provides an output interface between the search device 1100 for the neural network model structure and a user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, slides, and gestures on the touch panel. The touch sensor may not only sense the boundary of the touch or sliding action, but also detect the duration and pressure associated with the touch or slide operation. In some embodiments, the multimedia component 1108 includes a front camera and/or a rear camera. When the search device 1100 for the neural network model structure is in an operation mode, such as a shooting mode or a video mode, the front camera and/or the rear camera may receive external multimedia data. Each front camera and each rear camera may be a fixed optical lens system or have focal length and optical zoom capability.

The audio component 1110 is configured to output and/or input audio signals. For example, the audio component 1110 includes a microphone (MIC), and when the search device 1100 for the neural network model structure is in an operational mode, such as a call mode, a recording mode, or a voice recognition mode, the microphone is configured to receive external audio signals. The received audio signal may be further stored in the memory 1102 or sent through the communication component 1116. In some embodiments, the audio component 1110 further includes a speaker for outputting audio signals.

The I/O interface 1112 provides an interface between the processing component 1102 and a peripheral interface module which may be a keyboard, a click wheel, a button, and the like. These buttons may include, but are not limited to, a home button, a volume button, a start button and a lock button.

The sensor assembly 1114 includes one or more sensors for providing a status assessment of various aspects for the search device 1100 for the neural network model structure. For example, the sensor component 1114 may detect an open/closed state of the search device 1100 for the neural network model structure, a relative positioning of components, such as the display and keypad of the search device 1100 for the neural network model structure, the sensor component 1114 may further detect a position change of the search device 1100 for the neural network model structure or one component of the search device 1100 for the neural network model structure, the presence or absence of contact of the user with the search device 1100 for the neural network model structure, azimuth or acceleration/deceleration of the search device 1100 for the neural network model structure, and temperature changes of the search device 1100 for the neural network model structure. The sensor component 1114 may include a proximity sensor, configured to detect the presence of nearby objects without any physical contact. The sensor component 1114 may further include a light sensor, such as a CMOS or CCD image sensor, for use in imaging applications. In some embodiments, the sensor component 1114 may further include an acceleration sensor, a gyro sensor, a magnetic sensor, a pressure sensor, or a temperature sensor.

The communication component 1116 is configured to facilitate wired or wireless communication between the search device 1100 for the neural network model structure and other devices. The search device 1100 for the neural network model structure may access a wireless network based on a communication standard such as WiFi, 4G or 5G, or a combination thereof. In an exemplary embodiment, the communication component 1116 receives broadcast signals or information about broadcast from an external broadcast management system through a broadcast channel. In an exemplary embodiment, the communication component 1116 further includes a near field communication (NFC) module to facilitate short range communication. In an exemplary embodiment, the communication component 1116 may be implemented based on radio frequency identification (RFID) technology, infrared data association (IrDA) technology, ultra-wideband (UWB) technology, Bluetooth (BT) technology and other technologies.

In an exemplary embodiment, the search device 1100 for the neural network model structure may be implemented by one or more application specific integrated circuits (ASICs), digital signal processors (DSP), digital signal processing devices (DSPD), programmable logic devices (PLD), field programmable gate arrays (FPGA), controllers, microcontrollers, microprocessors, or other electronic components, for performing the methods described above.

In an exemplary embodiment, there is further provided a non-transitory computer readable storage medium including instructions, such as the memory 1102 including instructions, the instructions may be executed by the processor 220 of the search device 1100 for the neural network model structure to perform the above method. For example, the non-transitory computer readable storage medium may be a ROM, a random access memory (RAM), a CD-ROM, a magnetic tape, a floppy disk, an optical data storage device, and the like.

Although the operations in the embodiments of the present disclosure are described in a specific order in the drawings, it should not be construed as requiring that the operations be performed in the specific order shown or serially, or that all of the operations shown should be performed to obtain the desired result. In some embodiments, multitasking and parallel processing may be advantageous.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and various modifications and changes can be made without departing from the scope thereof. It is intended that the scope of the disclosure only be limited by the appended claims.

What is claimed is:

1. A search method for a neural network model structure, comprising:
   generating an initial generation population of network model structure based on multi-objective optimization hyper parameters, as a current generation population of network model structure;
   performing selection and crossover on the current generation population of network model structure;
   generating a part of network model structure based on reinforcement learning mutation, and generating a remaining part of network model structure based on random mutation on the selected and crossed network model structure;
   generating a new population of network model structure based on the part of network model structure generated by reinforcement learning mutation and the remaining part of network model structure generated by random mutation;
   searching a next generation population of network model structure based on the current generation population of network model structure and the new population of network model structure; and
   using the next generation population of network model structure as the current generation population of network model structure, repeating the performing selection and crossover, the generating a part of network model structure and generating a remaining part of network model structure, the generating a new population of network model structure, and the searching a next generation population of network model structure, until a multi-objective optimization state is optimal, and selecting a neural network model structure suitable for different scenarios from a final generation population of network model structure.

2. The search method according to claim 1, wherein the multi-objective optimization parameters comprise an inference time for running the network model structure; and
   after generating the new population of the network model structure, the search method further comprises:
   sending each network model structure in the new population of network model structure to a device side running the network model structure, and running the network model structure by a neural network engine of the device side; and
   obtaining an inference time of the neural network engine of the device side for running each network model structure in the new population of the network model structure;
   wherein the searching a next generation population of network model structure based on the current generation population of network model structure and the new population of network model structure comprises:
   searching the next generation population of network model structure based on the inference time, the current generation population of network model structure, and the new population of network model structure.

3. The search method according to claim 1, wherein the searching a next generation population of network model structure based on the current generation population of network model structure and the new population of network model structure comprises:
    searching the next generation population of network model structure based on the current generation population of network model structure and the new population of network model structure using a predictive evaluation index;
    wherein the predictive evaluation index is determined according to an automatic encoding regressor, and the automatic encoding regressor is an automatic encoding regressor for predicting an evaluation index and is obtained by pre-training the network model structure and the evaluation index.

4. The search method according to claim 1, wherein the part of network model structure generated based on reinforcement learning mutation and the remaining part of network model structure generated by random mutation satisfy a preset ratio, the preset ratio being a random number.

5. The search method according to claim 2, wherein the part of network model structure generated based on reinforcement learning mutation and the remaining part of network model structure generated by random mutation satisfy a preset ratio, the preset ratio being a random number.

6. The search method according to claim 3, wherein the part of network model structure generated based on reinforcement learning mutation and the remaining part of network model structure generated by random mutation satisfy a preset ratio, the preset ratio being a random number.

7. A search device for a neural network model structure, comprising:
    a processor; and
    a memory storing instructions executable by the processor, wherein the processor is configured to;
    generate an initial generation population of network model structure based on multi-objective optimization hyperparameters, as a current generation population of network model structure;
    perform selection and crossover on the current generation population of network model structure;
    generate a part of network model structure based on reinforcement learning mutation, and generate a remaining part of network model structure based on random mutation on the selected and crossed network model structure;
    generate a new population of network model structure based on the part of network model structure generated by reinforcement learning mutation and the remaining part of network model structure generated by random mutation; and
    search a next generation population of network model structure based on the current generation population of network model structure and the new population of network model structure; and
    using the next generation population of network model structure as the current generation population of network model structure, repeat the performing selection and crossover, the generating a part of network model structure and generating a remaining part of network model structure, the generating a new population of network model structure, and the searching a next generation population of network model structure, until a multi-objective optimization state is optimal, and select a neural network model structure suitable for different scenarios from a final generation population of network model structure.

8. The search device according to claim 7, wherein the multi-objective optimization parameters comprise an inference time for running the network model structure; and the processor is further configured to:
    after generating the new population of the network model structure, send each network model structure in the new population of network model structure to a device side running the network model structure, run the network model structure by a neural network engine of the device side, and obtain inference time of the neural network engine of the device side for running each network model structure in the new population of the network model structure; and
    search the next generation population of network model structure based on the inference time, the current generation population of network model structure, and the new population of network model structure.

9. The search device according to claim 7, wherein the processor is further configured to:
    search the next generation population of network model structure based on the current generation population of network model structure and the new population of network model structure using a predictive evaluation index;
    wherein the predictive evaluation index is determined according to the automatic encoding regressor, and the automatic encoding regressor is an automatic encoding regressor for predicting an evaluation index and is obtained by pre-training the network model structure and the evaluation index.

10. The search device according to claim 7, wherein the part of network model structure generated based on reinforcement learning mutation and the remaining part of network model structure generated by random mutation satisfy a preset ratio, the preset ratio being a random number.

11. The search device according to claim 8, wherein the part of network model structure generated based on reinforcement learning mutation and the remaining part of network model structure generated by random mutation satisfy a preset ratio, the preset ratio being a random number.

12. The search device according to claim 9, wherein the part of network model structure generated based on reinforcement learning mutation and the remaining part of network model structure generated by random mutation satisfy a preset ratio, the preset ratio being a random number.

13. A non-transitory computer-readable storage medium having stored therein instructions that, when executed by a processor of a terminal, cause the terminal to perform a search method for a neural network model structure, the search method comprising:
    generating an initial generation population of network model structure based on multi-objective optimization hyper parameters, as a current generation population of network model structure;
    performing selection and crossover on the current generation population of network model structure;
    generating a part of network model structure based on reinforcement learning mutation, and generating a remaining part of network model structure based on random mutation on the selected and crossed network model structure;
    generating a new population of network model structure based on the part of network model structure generated by reinforcement learning mutation and the remaining part of network model structure generated by random mutation;

searching a next generation population of network model structure based on the current generation population of network model structure and the new population of network model structure;

using the next generation population of network model structure as the current generation population of network model structure, repeating the performing selection and crossover, the generating a part of network model structure and generating a remaining part of network model structure, the generating a new population of network model structure, and the searching a next generation population of network model structure, until a multi-objective optimization state is optimal, and selecting a neural network model structure suitable for different scenarios from a final generation population of network model structure.

14. The non-transitory computer-readable storage medium of claim 13, wherein the multi-objective optimization parameters comprise an inference time for running the network model structure; and after generating the new population of the network model structure, the search method further comprises:

sending each network model structure in the new population of network model structure to a device side running the network model structure, and running the network model structure by a neural network engine of the device side; and obtaining an inference time of the neural network engine of the device side for running each network model structure in the new population of the network model structure;

wherein the searching a next generation population of network model structure based on the current generation population of network model structure and the new population of network model structure comprises:

searching the next generation population of network model structure based on the inference time, the current generation population of network model structure, and the new population of network model structure.

15. The non-transitory computer-readable storage medium of claim 13, wherein the searching a next generation population of network model structure based on the current generation population of network model structure and the new population of network model structure comprises:

searching the next generation population of network model structure based on the current generation population of network model structure and the new population of network model structure using a predictive evaluation index;

wherein the predictive evaluation index is determined according to an automatic encoding regressor, and the automatic encoding regressor is an automatic encoding regressor for predicting an evaluation index and is obtained by pre-training the network model structure and the evaluation index.

16. The non-transitory computer-readable storage medium of claim 13, wherein the part of network model structure generated based on reinforcement learning mutation and the remaining part of network model structure generated by random mutation satisfy a preset ratio, the preset ratio being a random number.

17. The non-transitory computer-readable storage medium of claim 14, wherein the part of network model structure generated based on reinforcement learning mutation and the remaining part of network model structure generated by random mutation satisfy a preset ratio, the preset ratio being a random number.

18. The non-transitory computer-readable storage medium of claim 15, wherein the part of network model structure generated based on reinforcement learning mutation and the remaining part of network model structure generated by random mutation satisfy a preset ratio, the preset ratio being a random number.

* * * * *